United States Patent Office 3,398,044
Patented Aug. 20, 1968

3,398,044
BONDING OF ORGANIC RESINS OR RUBBERS
TO INORGANIC SUBSTANCES
Edwin P. Plueddemann, Midland, Mich., assignor to Dow Corning Corporation, Midland, Mich., a corporation of Michigan
No Drawing. Filed Feb. 1, 1965, Ser. No. 429,667
18 Claims. (Cl. 161—193)

ABSTRACT OF THE DISCLOSURE

Process of bonding an organic polymer such as thermoplastic resins to an inorganic substrate such as siliceous materials imparting no discoloration to said resins and improving the strength between the two members giving hydrolytic stability.

An illustrative example being the treatment of glass cloth with a partial hydrolyzate of nitrophenyltriethoxysilane and drying it at 230° F.; laminates formed thereby are interspersed with films of thermoplastic at 65 p.s.i. at 250° C. for one-half hour.

---

This application relates to a new method of bonding organic polymers to inorganic substrates such as glass, quartz, silica, ceramic, silicone rubber, silicone resins, aluminum, steel, copper, alumina, magnesium oxide, cement, stone, etc.

The bonds formed by the method of this application exhibit increased strength and hydrolytic stability. This invention has particular utility for use with the thermoplastic resins, since there are few methods known for bonding thermoplastic resins to siliceous materials with a bond that is hydrolytically stable and which has satisfactory strength. For this reason, manufacturers have been forced to use the more expensive thermosetting resins in applications where thermoplastic resins would be suitable but for their poor bonding characteristics.

An object of this invention is therefore to improve the bonding characteristics of thermoplastic resins in order that they can replace thermosetting resins in many applications. The process of this invention can accomplish this object without the discoloration of the resin that often occurs with other bonding processes.

This invention is also useful for bonding organic rubbers and thermosetting resins to inorganic substrates.

This application relates to the process of bonding (a) an organic polymer to (b) a solid substrate selected from the group consisting of siliceous materials, inorganic oxides, and metals, comprising (1) applying to the surface of at least one of (a) and (b) a material (c) comprising a substance selected from the group consisting of compounds of the formula $$R'_nSiA$$
$$\phantom{R'_nSi}|$$
$$\phantom{R'_nSi}R_b$$

and hydrolyzates thereof where A is selected from the group consisting of

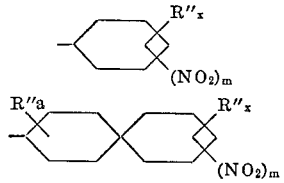

and

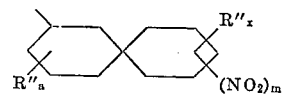

R is a monovalent hydrocarbon radical of no more than six carbon atoms, R' is a hydrolyzable group, R" is an alkyl radical of 1 to 3 carbon atoms, $a$ and $x$ each have an average value of 0 to 1, $m$ has an average value of 1 to 2, $b$ has an average value of 0 to 2, and $n$ has an average value of 1 to 3, the sum of $n$ and $b$ being 3, (2) bringing (a) and (b) into contact with each other with (c) between them and (3) applying energy to the composite of (a), (b) and (c) until a bond is formed between them which is superior in strength and hydrolytic stability to the bond between (a) and (b) alone.

Any solid, organic polymer is suitable for use in this process, e.g. thermoplastic and thermosetting resins such as polystyrene, poly(styrene-acrylonitrile), polyethylene, polypropylene, polyamide resins, poly(ethyleneterephthalate), polycarbonate resins, alkyd resins, polyester resins, silicone resins, polyvinyl chloride, copolymers of vinylchloride and vinylidene chloride, polyvinyl acetate, polyisoprene, poly(acrylonitrile-butadiene-styrene), polyformaldehyde, melamine resins, melamine-alkyd resins, acrylic resins, phenolic resins, amine-cured epoxy resins; and organic rubbers such as natural rubber, styrene-butadiene rubber, stero-regular cis polybutadiene, polyisoprene, ethylene-propylene copolymers, ethylene-propylene-copolymers, ethylene-propylene-diolefin terpolymers, polyacrylate rubbers such as copolymers of ethylacrylate and beta-chloroethylvinylether, butyl rubber, and butadiene-acrylonitrile rubber.

Any solid substrate as described can be used as (b) in this process: e.g. siliceous materials such as glass sheets, glass fibers, glass cloth, glass powder, silica powder, quartz fiebr, ceramic sheets, stone, cement, silicone rubber, and silicone resins; and other inorganic materials such as metals and metal oxides.

By "solid" is meant the solid phase; i.e. elastomeric as well as rigid. Furthermore, "solid" refers to the product after cure; it does not exclude the use of fluid forms of (a) and (b) in the making of bonded product.

The silicone composition (c) can be applied to the surface of either or both of (a) and (b) in pure form, in aqueous or organic solution, by vapor phase addition, or as an aqueous or organic emulsion. The manner of application is not critical; if either (a) or (b) is in a fluid or plastic form before cure, ingredient (c) can often be mixed into the substrate, if sufficient quantity of (c) is used so that a substantial amount of (c) is found at the surface of the substrate. Such a process is considered to constitute "applying" (c) to the surface, and is often desirable for use with organic rubbers.

It is believed that adsorbed water on the solid, inorganic substate, which is always present under normal conditions, reacts with hydroxyl or hydrolyzable groups bonded to (c) to form a bond between (c) and the inorganic substrate used. A fully-condensed hydrolyzate of (c) can, however, be baked unto the inorganic substrate, and partially condensed hydrolyzates of (c) can bond to anhydrous inorganic substrates.

R can be any monovalent hydrocarbon atom of no more than six carbon atoms such as methyl, ethyl, isopropyl, vinyl, ethynyl, hexyl, cyclopentyl, cyclohexenyl and phenyl.

R' can be any hydrolyzable group known to the art, e.g. alkoxy groups such as methoxy, ethoxy, or butoxy; halogen atoms such as chlorine and bromine, alkoxyalkoxy groups such as beta-ethoxyethoxy, ethoxymethoxy, and methoxymethoxy; acyloxy groups such as the acetoxy and the propionoxy groups, dialkyl-substituted isocyanoxy groups such as

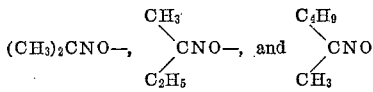

and the isocyanate group.

R" can be any alkyl radical of 1 to 3 carbon atoms, i.e. methyl, ethyl, propyl, or isopropyl.

Examples of A are the meta- and para-nitrophenyl radicals,

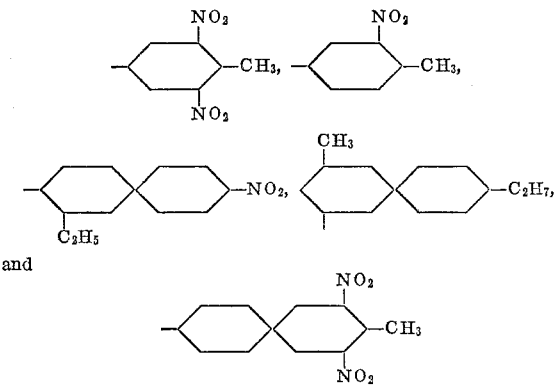

It is preferred for $n$ to have a value of 2 to 3 and for $m$ to be 1.

Ingredient (c) can be a mixture of silanes or a cohydrolyzate as well as a single silane or hydrolyzate, and not all of the silanes need to possess an A group. Examples of other silanes that can be present along with the above-described silanes are dimethdimethoxysilane, phenyltrichlorosilane, and 3,3,3 - trifluoropropyldimethylsilanol.

It is preferred for at least one out of five silicon atoms of ingredient (c) to possess an A group. It is also important for the other silanes present to be hydrolyzable.

The amount of ingredient (c) that must be added is not critical, but the strength and hydrolytic stability of the bond will increase as more of (c) is added until a maximum strength is reached. It is believed that this maximum is achieved when ingredient (c) covers its substrate in roughly a monomolecular layer. The strength of the bond may fall again from this maximum if an excess of (c) is used.

Ingredient (c) can be made as follows:

Phenyl or biphenyl-containing fluorosilanes such as phenylmethyldifluorosilane, biphenyltrifluorosilane, phenyltrifluorosilane, or biphenyldiethylfluorosilane can be converted to the nitroaryl derivatives by reacting a chloroform solution of the silanes in the known manner with a mixture of nitric and sulfuric acids. The resulting nitroarylfluorosilanes can be converted to alkoxysilanes by reaction with an alkylsilicate such as ethylorthosilicate.

The hydrolyzates of these silanes can be prepared either by simple hydrolysis or by applying the above nitration reaction to the hydrolyzates of arylsilanes.

Step (2) of the process of this invention can be performed in many ways. If glass cloth or metal sheets are used, ingredient (c) can be placed on the glass cloth or metal, and sheets of (a) can then be placed against the cloth or metal; or the sheets of (a) can be treated with (c) to obtain the same result. Laminates can be formed in this manner.

Glass cloth or cloths which are treated with (c) can be immersed in a concentrated solution of (a), and the solvent can be removed to form a resin-impregnated cloth.

Molding compounds and filled rubbers can be made by adding materials such as silica, alumina, glass powder, or glass or quartz fibers, all of which are treated with (c), to an organic resin or rubber in a plastic phase.

Objects which are made of organic resin or rubber can be treated with (c) and brought into contact with silicone rubber in a plastic phase. The silicone rubber then can be cured at a temperature below the resin melting point or the rubber decomposition point to form a solid composite or laminate.

These above examples are but a few of the more important variations of step (2). They are by no means the only methods of performing step (2).

If desired, the substrate with ingredient (c) thereon can be heated in order to dry it before the other substrate is applied. Also, ingredient (c) can optionally be applied to both substrates before bringing them together.

Step (3) can be performed by heating the composite of (a), (b), and (c), under pressure if desired, until a superior, hydrolytically-stable bond is formed.

The temperature that is required to form a superior bond varies with the nature of the organic resin and of ingredient (c). It is not possible to predict exactly what temperature will be required to cause bonding in a given system, but some specific bonding temperatures are illustrated below.

The activation temperature for most combinations of organic material and (c) is not less than 175° C., though some systems will form bonds at temperatures lower than that. The preferred activation temperature is from 225° to 300° C. It may be desirable at such temperatures to remove air from the system in order to prevent oxidation of the organic polymers.

If resin laminates, or any other object where flow of the organic polymer is permissible, are being made, the heating temperature can go above the molding point of the organic resin to near its decomposition point. Excellent bonds can be obtained in this manner, especially when heat and pressure are used in combination.

Step (3) can also be performed by subjecting the composite of (a), (b) and (c) to high energy radiation such as ultraviolet light or gamma radiation. Peroxide catalysts, etc. can also be added to ingredient (c) to enhance its reactivity.

The amount of radiation needed to create bonding, and the precise effect of the peroxide catalyst, varies with the combination of ingredients (a) and (c) used. It can, however, be seen that the type of energy used to create the bond is not critical.

The best duration of heating or exposure to radiation is likewise variable and dependent upon the type of ingredients (a) and (c). In most cases it varies from 5 minutes to 2 hours.

The process of this invention is useful for making molding compounds, laminates, and coatings, all of which utilize a strong, hydrolytically-stable bond between an organic polymer and an inorganic substrate.

The following examples are illustrative only and should not be construed as limiting the invention which is properly delineated in the appended claims.

Example 1

One part by weight of a mixture of o, m, and p nitrophenyltriethoxysilanes was dispersed in a mixture of approximately 50 parts of ethanol and 50 parts of water, there being a trace of acetic acid present.

A partial hydrolyzate of nitrophenyltriethoxysilane was thereby formed.

Sheets of 181 heat-cleaned type E glass cloth were dipped in the above dispersion and dried for 7 minutes at 230° F.

Laminates were prepared by pressing 14 layers of glass cloth interspersed with 10 mil films of thermoplastic at 65 p.s.i. at a temperature of 250° C. for one-half hour. The resulting laminates had a thickness of about 0.15 inch.

The flexural and compressive strengths of the laminates prepared are as follows:

(a) Using polystyrene as the thermoplastic:

| | Flex (p.s.i.) | | Compressive (p.s.i.) | |
|---|---|---|---|---|
| | Dry | After 2 hrs. in boiling water | Dry | After 2 hrs. in boiling water |
| Untreated glass cloth | 32,800 | 20,300 | 9,100 | 5,000 |
| Cloth treated with the partial hydrolyzate | 50,300 | 40,300 | 28,800 | 19,400 |

(b) Using poly(styrene-acrylonitrile) as the thermoplastic:

| | Flex (p.s.i.) | | Compressive (p.s.i.) | |
|---|---|---|---|---|
| | Dry | After 2 hrs. in boiling water | Dry | After 2 hrs. in boiling water |
| Untreated glass cloth | 42,900 | 29,200 | 17,200 | 11,000 |
| Cloth treated with the partial hydrolyzate | 63,600 | 51,900 | 36,600 | 23,200 |

Example 2

The partial hydrolyzate treated glass cloth of Example 1 was impregnated with an acetone solution (60% solids) of an epoxy resin consisting of 100 parts by weight of a bisphenol A epichlorohydrin resin (Dow Epoxy Resin 331) and 14.5 parts of m-phenylenediamine, so that the glass cloth was impregnated with 35 weight per cent of resin, based on the weight of the glass.

14 plies of this glass cloth were laminated and pressed at 30 p.s.i. and 300° F. for 30 minutes.

Solid laminates were thereby formed having the following properties:

| | Flex (p.s.i.) | | Compressive (p.s.i.) | |
|---|---|---|---|---|
| | Dry | After 2 hrs. in boiling water | Dry | After 2 hrs. in boiling water |
| Untreated glass cloth (i.e. no silane) | 71,300 | 51,700 | 61,800 | 27,400 |
| Partial hydrolyzate treated glass cloth | 79,500 | 69,300 | 52,400 | 42,000 |

Example 3

When a two weight percent dispersion of

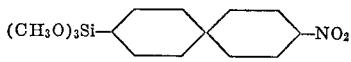

in toluene is sprayed on glass cloth and dried and 10 plies of this cloth are stacked with a thin sheet of polyethylene between the glass cloths, heating at 275° C. and pressing at 10 p.s.i. for one hour yields a tough laminate of improved strength and hydrolytic stability.

Example 4

When a thin film of

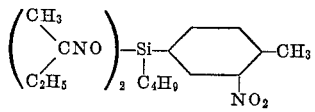

is placed on a sheet of a polycarbonate resin (the product of the sodium salt of bisphenol A and phosgene) and a layer of unvulcanized silicone rubber is placed on top of this, and the structure is heated at 150° C. for 15 minutes to vulcanize the silicone rubber and then at 300° C. for one-half hour in an oxygen-free environment, a firm bond is formed between the polycarbonate resin and the silicone rubber.

Example 5

When chopped glass fibers are dipped in an aqueous cohydrolyzate of 0.1 mole of

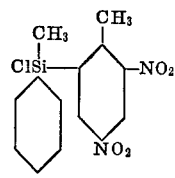

and 0.3 mole of $(CH_3)_2SiCl_2$ and dried at 100° C., and when one part by weight of these fibers are mixed into two parts by weight of a molten, commercial polyvinylidinechloride molding compound and heated at 200° C. for one hour, cooling yields a tough, filled molding compound of improved physical properties.

Example 6

When powdered alumina is treated with a dilute aqueous solution of the hydrolyzate of a mixture of 0.1 mole of

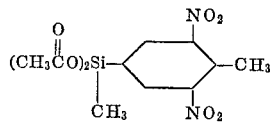

0.01 mole of

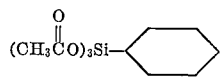

and 0.4 mole of

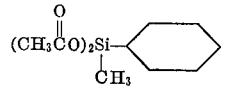

and is dried at 90° C., and this is mixed with an equal weight of polymethylmethacrylate and molded at 250° C. a molded object of improved properties is produced.

Example 7

When a mixture 4 parts by weight of coconut oil alkyd, 2 parts of a butanol-modified melamineformaldehyde condensate and 4 parts of xylene is painted on a steel plate that has been treated with a small amount of p-nitrophenylmethyldiethoxysilane, heating of the plate for 15 minutes at 190° C. yields a cured melamine-alkyd film having superior adhesion to the plate.

Example 8

When a plastisol of 3 g. of polyvinylchloride dispersed in 7 g. of dioctylphthalate is mixed with 0.1 g. of p-nitrophenyltriacetoxysilane, and an aluminum bar is dipped in this plastisol and baked at 200° C. for 10 minutes with rotation of the bar, the cooled bar possesses a tough coating that strongly adheres to the bar.

That which is claimed is:
1. The process of bonding
  (a) an organic polymer selected from the group consisting of thermoplastic resins, thermosetting resins, organic and natural rubbers to
  (b) a solid substrate selected from the group consisting of siliceous materials, aluminum, copper, steel, alumina, and magnesium oxide comprising
    (1) applying to the surface of at least one of (a) and (b), a material (c) comprising substance selected from the group consisting of compounds of the formula

and hydrolyzates thereof where A is selected from the group consisting of

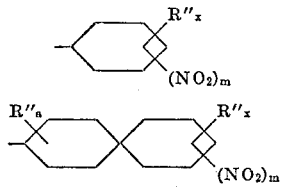

and

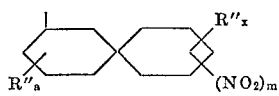

R is a monovalent hydrocarbon radical of no more than six carbon atoms, R' is a hydrolyzable group, R'' is an alkyl radical of 1 to 3 carbon atoms, $a$ and $x$ each have an average value of 0 to 1, $m$ has an average value of 1 to 2, $b$ has an average value of 0 to 2, and $n$ has an average value of 1 to 3, the sum of $n$ and $b$ being 3, (2) bringing (a) and (b) into contact with each other with (c) between them, and (3) applying radiant energy to the composite of (a), (b) and (c) until a bond is formed between them which is superior in strength and hydrolytic stability to the bond between (a) and (b) alone.

2. The process of claim 1 where (b) is glass.
3. The process of claim 1 where (b) is silicone rubber.
4. The process of claim 1 where (a) is a thermoplastic resin.
5. The process of claim 1 where (a) is a copolymer of polystyrene and acrylonitrile.
6. The process of claim 1 where (a) is polystyrene.
7. The process of claim 1 where (a) is polymethylmethacrylate.
8. The process of claim 1 where (a) is polyethylene.
9. The process of claim 1 where A is the nitrophenyl radical.
10. The process of claim 1 where A is

11. The process of claim 1 where (c) is

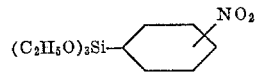

12. The process of claim 1 where (c) is

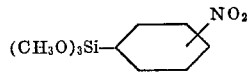

13. The process of claim 1 where (c) is

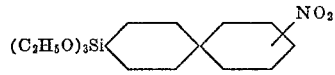

14. The process of claim 1 where (c) is

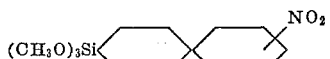

15. The process of claim 1 where (c) is

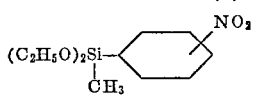

16. An article of manufacture consisting essentially of
(a) a solid organic polymer selected from the group consisting of thermoplastic resins, thermosetting resins, organic and natural rubbers bonded to
(b) a solid substrate selected from the group consisting of siliceous materials, aluminum, copper, steel, alumina and magnesium oxide, there being between (a) and (b) at their points of contact a material selected from the group consisting of compounds of the formula

and hydrolyzates thereof, where A is selected from the group consisting of

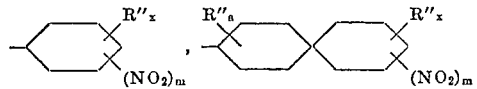

and

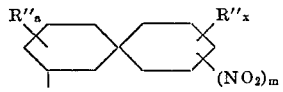

R is a monovalent hydrocarbon radical of no more than six carbon atoms, R' is a hydrolyzable group, R'' is an alkyl radical of 1 to 3 carbon atoms, $a$ and $x$ each have an average value of 0 to 1, $m$ has an average value of 1 to 2, $b$ has an average value of 0 to 2, and $n$ has an average value of 1 to 3, the sum of $n$ and $b$ being 3.

17. The article of manufacture in accordance with claim 16 where (b) is a glass fabric.
18. The article of manufacture in accordance with claim 16 where (b) is glass fibers.

References Cited

UNITED STATES PATENTS 3,306,800   2/1967   Plueddemann _____ 161—193

ROBERT F. BURNETT, *Primary Examiner.*

W. J. VAN BALEN, *Assistant Examiner.*